(12) United States Patent
Zhang et al.

(10) Patent No.: US 10,241,361 B2
(45) Date of Patent: Mar. 26, 2019

(54) COLOR FILM SUBSTRATE, MANUFACTURING METHOD THEREOF AND DISPLAY DEVICE

(71) Applicants: Boe Technology Group Co., Ltd., Beijing (CN); Beijing Boe Display Technology Co., Ltd., Beijing (CN)

(72) Inventors: Zhichao Zhang, Beijing (CN); Tsungchieh Kuo, Beijing (CN); Zheng Liu, Beijing (CN); Mingxuan Liu, Beijing (CN); Shoukun Wang, Beijing (CN); Jingjing Jiang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 113 days.

(21) Appl. No.: 15/503,046

(22) PCT Filed: Jul. 5, 2016

(86) PCT No.: PCT/CN2016/088581
§ 371 (c)(1),
(2) Date: Feb. 10, 2017

(87) PCT Pub. No.: WO2017/107439
PCT Pub. Date: Jun. 29, 2017

(65) Prior Publication Data
US 2018/0113354 A1 Apr. 26, 2018

(30) Foreign Application Priority Data
Dec. 21, 2015 (CN) .......................... 2015 1 0959626

(51) Int. Cl.
*G02F 1/1335* (2006.01)

(52) U.S. Cl.
CPC .. *G02F 1/133512* (2013.01); *G02F 1/133514* (2013.01); *G02F 1/133516* (2013.01)

(58) Field of Classification Search
CPC ......... G02F 1/133512; G02F 1/133514; G02F 1/133516
See application file for complete search history.

(56) References Cited

U.S. PATENT DOCUMENTS

2006/0017865 A1* 1/2006 Tsubata ............. G02F 1/133512
349/106
2008/0231681 A1* 9/2008 Chen ................. G02F 1/133514
347/106
(Continued)

FOREIGN PATENT DOCUMENTS

CN 1609637 4/2005
CN 101023380 8/2007
(Continued)

OTHER PUBLICATIONS

First Office Action for Chinese Patent Application No. 201510959626.X dated Dec. 29, 2017.
(Continued)

*Primary Examiner* — Lucy P Chien
(74) *Attorney, Agent, or Firm* — Calfee, Halter & Griswold LLP

(57) ABSTRACT

A color film substrate comprises: a basal substrate, a plurality of color filters of at least one color formed on the basal substrate, and a black matrix formed on the basal substrate. The black matrix has a plurality of openings one-to-one corresponding to the plurality of color filters of at least one color. In a cross section perpendicular to the basal substrate, an edge of the color filter and an opening edge of the black matrix have an overlapping region. According to the color film substrate, manufacturing method thereof and display device provided by the embodiments of the present disclo-
(Continued)

sure, by applying the technology of halftone mask plate and positive/negative photoresist, the patterns for the plurality of color filters of the at least one color and the pattern of the black matrix can be formed with one filter mask plate.

6 Claims, 3 Drawing Sheets

(56) References Cited

U.S. PATENT DOCUMENTS

| | | | | |
|---|---|---|---|---|
| 2012/0038867 | A1* | 2/2012 | Kwon | G02F 1/133512 |
| | | | | 349/110 |
| 2012/0293883 | A1 | 11/2012 | Wang et al. | |
| 2015/0338702 | A1* | 11/2015 | Xie | G02F 1/133516 |
| | | | | 349/106 |

FOREIGN PATENT DOCUMENTS

| | | |
|---|---|---|
| CN | 102645690 A | 8/2012 |
| CN | 202837751 | 3/2013 |
| CN | 103698931 | 4/2014 |
| CN | 104280805 | 1/2015 |
| CN | 104459861 | 3/2015 |
| CN | 104932139 A | 9/2015 |
| CN | 105388661 | 3/2016 |

OTHER PUBLICATIONS

International Search Report for PCT/CN2016/088581 dated Sep. 1, 2016.

* cited by examiner

COLOR FILM SUBSTRATE, MANUFACTURING METHOD THEREOF AND DISPLAY DEVICE

RELATED APPLICATIONS

The present application is the U.S. national phase entry of the international application PCT/CN2016/088581, with an international filing date of Jul. 5, 2016, which claims the benefit of Chinese Patent Application No. 201510959626.X, filed on Dec. 21, 2015, the entire disclosures of which are incorporated herein by reference.

TECHNICAL FIELD

The present disclosure relates to the field of display technology, in particular to a color film substrate, a manufacturing method thereof and a display device.

BACKGROUND

In the technology of color film (e.g., TFT-LCD color film), a black matrix has black borders for shielding the pattern boundary of various color filters (e.g., red filter R, green filter G and blue filter B), preventing light leakage. In the actual production, the mask plate can typically be shared by various color filters, since the patterns of the red filter R, green filter G and blue filter B are similar. During manufacturing the patterns of the green filter and blue filter, a mask plate for the red filter can be shifted, so as to obtain the patterns of the green and blue filters on the glass substrate. Therefore the mask plates for the green filter and blue filter are no longer required.

SUMMARY

However, the inventor realized that for a pattern of e.g. red filter, a pattern of a black matrix corresponding to the pattern of the red filter is basically complementary to the pattern of the red filter. This makes it possible for the black matrix to share a mask plate with the red filter, the green filter and the blue filter.

To this end, the embodiments of the present disclosure provide a color film substrate, a manufacturing method thereof and a display device. By applying the technology of halftone mask plate and positive/negative photoresist, the patterns for the plurality of color filters of the at least one color and the pattern of the black matrix can be formed with one filter mask plate. The black matrix mask plate is thus not required in the color film process, thereby greatly reducing the production cost.

An embodiment of the present disclosure provides a color film substrate. The color film substrate comprises: a basal substrate, a plurality of color filters of at least one color formed on the basal substrate, and a black matrix formed on the basal substrate. The black matrix has a plurality of openings one-to-one corresponding to the plurality of color filters of at least one color. In a cross section perpendicular to the basal substrate, an edge of the color filter and an opening edge of the black matrix have an overlapping region.

According to the color film substrate provided by the embodiment of the present disclosure, by applying the technology of halftone mask plate and positive/negative photoresist, the patterns for the plurality of color filters of the at least one color and the pattern of the black matrix can be formed with one filter mask plate. The black matrix mask plate is thus not required in the color film process, thereby greatly reducing the production cost.

Optionally, in the overlapping region, the color filter has a shape complementary to the black matrix.

Optionally, the edge of the color filter is located between the basal substrate and the opening edge of the black matrix.

Optionally, compared with a central region of the color filter, the edge of the color filter has a smaller thickness; compared with a central region of the black matrix, the opening edge of the black matrix has a smaller thickness.

Optionally, the color filter is formed with a negative photoresist, and the black matrix is formed with a positive photoresist.

Optionally, the plurality of color filters of at least one color comprises a red filter, a green filter and a blue filter.

Optionally, the plurality of color filters of at least one color comprises a red filter, a green filter, a blue filter and a white filter.

An embodiment of the disclosure further provides a method for manufacturing a color film substrate. The color film substrate comprises a basal substrate, a plurality of color filters of at least one color formed on the basal substrate, and a black matrix formed on the basal substrate. The black matrix has a plurality of openings one-to-one corresponding to the plurality of color filters of at least one color. The method comprises: forming the plurality of color filters of at least one color on the basal substrate with a halftone mask plate; and forming the black matrix with the same halftone mask plate.

According to the method for manufacturing a color film substrate provided by the embodiment of the present disclosure, by applying the technology of halftone mask plate and positive/negative photoresist, the patterns for the plurality of color filters of the at least one color and the pattern of the black matrix can be formed with one filter mask plate. The black matrix mask plate is thus not required in the color film process, thereby greatly reducing the production cost.

Optionally, the step of forming the plurality of color filters of at least one color on the basal substrate with a halftone mask plate comprises: for each color of the at least one color: aligning the halftone mask plate with a position for a color filter of the color; and performing an exposure process and a development process to form the color filter.

Optionally, the step of forming the black matrix with the same halftone mask plate comprises: respectively aligning the halftone mask plate with all positions for the plurality of color filters of the at least one color and performing an exposure process; and performing a development process to form the black matrix having the plurality of openings.

Optionally, the color filter is formed with a negative photoresist, and the black matrix is formed with a positive photoresist.

Optionally, the plurality of color filters of at least one color comprises a red filter, a green filter and a blue filter.

Optionally, the plurality of color filters of at least one color comprises a red filter, a green filter, a blue filter and a white filter.

An embodiment of the disclosure further provides a display device. The display device comprises the abovementioned color film substrate.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION

In the following, the technical solutions in embodiments of the present disclosure will be described clearly and completely in connection with the drawings in the embodiments of the present disclosure. Obviously, the described embodiments are only part of the embodiments of the present disclosure, and not all of the embodiments. Based on the embodiments in the present disclosure, one skilled in the art can easily ascertain the essential characteristics of the present disclosure and various changes and modifications can be made to adapt the various uses and characteristics without departing from the spirit and scope of the present invention as described herein.

Figure 1:
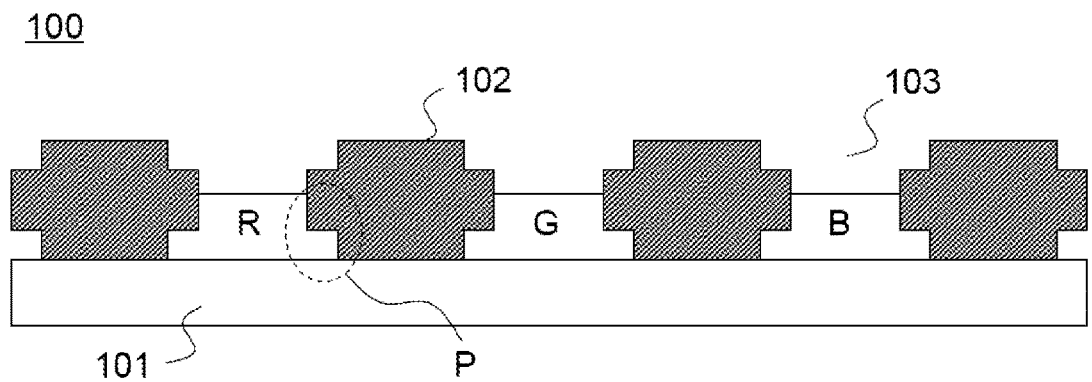
FIG. 1 is a structural schematic diagram of a color film substrate according to an embodiment of the disclosure.

FIG. 1 is a structural schematic diagram of a color film substrate according to an embodiment of the present disclosure. As shown in FIG. 1, according to an aspect of the present disclosure, an embodiment of the present disclosure provides a color film substrate 100. The color film substrate 100 comprises: a basal substrate 101, a plurality of color filters (R, G, B) of at least one color formed on the basal substrate 101, and a black matrix 102 formed on the basal substrate 101. The black matrix 102 has a plurality of openings 103 one-to-one corresponding to the plurality of color filters (R, G, B) of at least one color.

In a cross section perpendicular to the basal substrate 101, an edge of the color filter (R, G, B) and an edge of an opening 103 in the black matrix 102 have an overlapping region P. As shown in FIG. 1, the edge of the color filter is a lower portion of the color filter with a small thickness and protruding into the black matrix. The edge of the opening in the black matrix is a middle-level portion of the black matrix with a small thickness and protruding into the color filter. As can be seen from FIG. 1, the edge of the color filter (R, G, B) and the edge of the opening 103 in the black matrix 102 have an overlapping region P.

According to the color film substrate provided by the embodiment of the present disclosure, by applying the technology of halftone mask plate and positive/negative photoresist, the patterns for the plurality of color filters of the at least one color and the pattern of the black matrix can be formed with one filter mask plate. The black matrix mask plate is thus not required in the color film process, thereby greatly reducing the production cost.

Those skilled in the art can understand that though only R, G and B color filters are used in the embodiment of the disclosure, in the implementations of the disclosure, the color filters can also comprise a combination of various color filters such as R, G, B and W color filters. Moreover, the "color film substrate" in the embodiments of the disclosure refers to the color film substrate for forming a display panel with an array substrate through box aligning; it also refers to a display substrate in which the color filters are integrated into an array substrate. The embodiment of the disclosure is not limited to this. The color film substrate in the embodiments of the disclosure refers to a display substrate comprising color filters and a black matrix with the abovementioned arrangement, which pertains to the protection scope of the disclosure.

Optionally, in the overlapping region P, the color filter has a shape complementary to the black matrix. As shown in FIG. 1, the edge of the color filter is implanted into and in contact with the edge of the opening in the black matrix, therefore in this region the color filter has a shape complementary to the black matrix.

With such a configuration, it is ensured that the plurality of openings of the black matrix one-to-one correspond to the plurality of color filters, improving the aperture ratio of the color film substrate.

Optionally, the edge of the color filter (R, G, B) is located between the basal substrate 101 and the opening edge of the black matrix 102.

With such a configuration, the opening of the black matrix is located on the top of the color filter, avoiding light leakage more effectively.

Optionally, compared with a central region of the color filter (R, G, B), the edge of the color filter (R, G, B) has a smaller thickness; compared with a central region of the black matrix 102, the opening edge of the black matrix 102 has a smaller thickness.

With such a configuration, segment difference on the surface of the color film substrate can be reduced effectively. Though in FIG. 1 and FIGS. 3a-3f of the present disclosure, the edge of the color filter (R, G, B) and the opening edge of the black matrix 102 have rectangular shapes, those skilled in the art can understand that based on the characteristics of various processes (e.g., exposure time, photoresist type), the edge of the color filter (R, G, B) and the opening edge of the black matrix 102 can also have certain slopes or curved surfaces.

Optionally, the color filter (R, G, B) is formed with a negative photoresist, and the black matrix 102 is formed with a positive photoresist.

The black matrix is formed with a positive photoresist, therefore portions of the black matrix requiring no exposure are always shielded by the halftone mask plate during the manufacturing process.

Optionally, the plurality of color filters of at least one color comprises a red filter, a green filter and a blue filter.

A color film substrate can thus be realized with the red filter, green filter and blue filter.

Optionally, the plurality of color filters of at least one color comprises a red filter, a green filter, a blue filter and a white filter.

With the red filter, green filter, blue filter and white filter, a color film substrate can realize a relatively high display brightness.

According to another aspect of the disclosure, an embodiment of the disclosure further provides a method for manufacturing a color film substrate. The color film substrate comprises a basal substrate, a plurality of color filters of at least one color formed on the basal substrate, and a black matrix formed on the basal substrate. The black matrix has a plurality of openings one-to-one corresponding to the plurality of color filters of at least one color. The method comprises: forming the plurality of color filters of at least one color on the basal substrate with a halftone mask plate; and forming the black matrix with the same halftone mask plate.

According to the method for manufacturing a color film substrate provided by the embodiment of the present disclosure, by applying the technology of halftone mask plate and positive/negative photoresist, the patterns for the plurality of color filters of the at least one color and the pattern of the black matrix can be formed with one filter mask plate. The black matrix mask plate is thus not required in the color film process, thereby greatly reducing the production cost.

Figure 2:
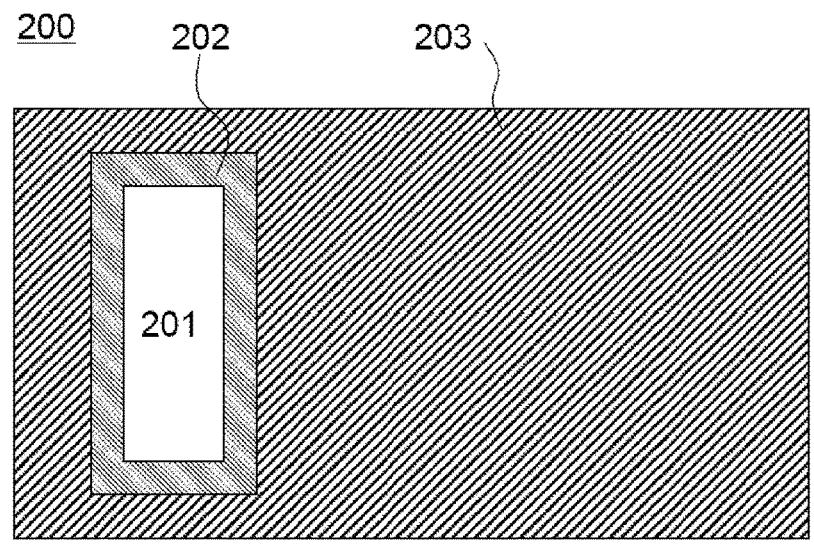
FIG. 2 is a schematic diagram showing a part of a halftone mask plate according to an embodiment of the disclosure.

As shown in FIG. 2, in an embodiment of the invention, a transparent region 201, a semi-transparent region 202 and an opaque region 203 are arranged in the halftone mask plate 200. The sum of the transparent region 201 and the semi-transparent region 202 corresponds to a pattern of a color filter. The sum of the semi-transparent region 202 and the opaque region 203 corresponds to a pattern of the black matrix. Due to the existence of the semi-transparent region 202, the color filter and the black matrix have an overlapping region. In this manner, a desired aperture ratio of the color film substrate can be obtained, and light leakage can also be prevented.

Optionally, the step of forming the plurality of color filters of at least one color on the basal substrate with a halftone mask plate comprises: for each color of the at least one color: aligning the halftone mask plate with a position for a color filter of the color; and performing an exposure process and a development process to form the color filter.

FIGS. 3a-3f are schematic diagrams showing the steps of the method for manufacturing a color film substrate according to an embodiment of the disclosure. The halftone mask plate 200 comprises the transparent region 201, semi-transparent region 202 and opaque region 203, which are also shown in FIG. 2.

Figure 3A:
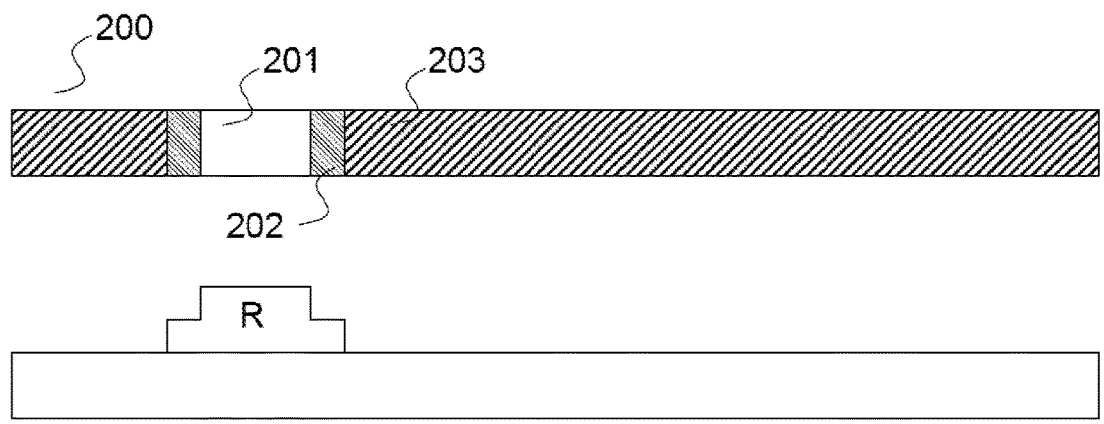
FIG. 3a is a schematic diagram of manufacturing a red filter R with a method for manufacturing a color film substrate according to an embodiment of the disclosure.

FIG. 3a is a schematic diagram of manufacturing a red filter R with a method for manufacturing a color film substrate according to an embodiment of the disclosure. The halftone mask plate 200 is aligned with a position of the red filter, then an exposure process and a development process are performed to form the red filter R.

Figure 3B:
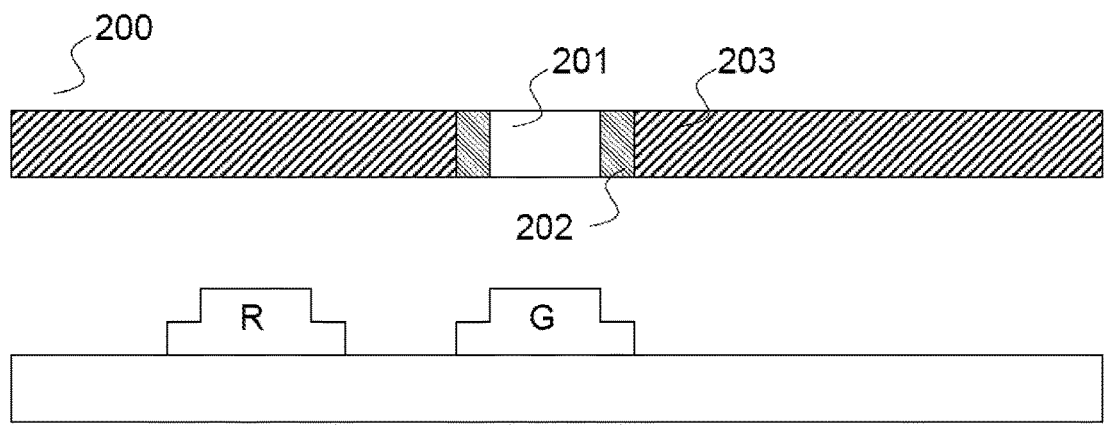
FIG. 3b is a schematic diagram of manufacturing a green filter G with a method for manufacturing a color film substrate according to an embodiment of the disclosure.

FIG. 3b is a schematic diagram of manufacturing a green filter G with a method for manufacturing a color film substrate according to an embodiment of the disclosure. The halftone mask plate 200 is aligned with a position of the green filter, then an exposure process and a development process are performed to form the green filter G.

Figure 3C:
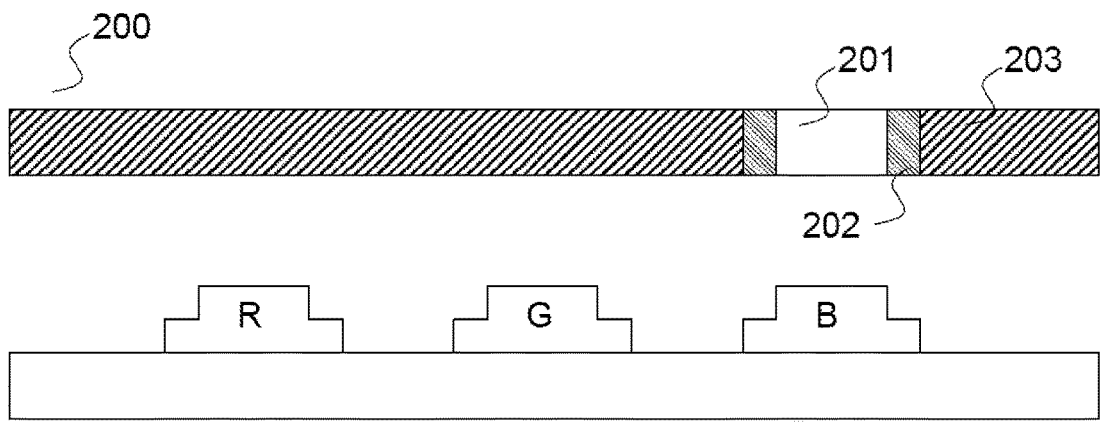
FIG. 3c is a schematic diagram of manufacturing a blue filter B with a method for manufacturing a color film substrate according to an embodiment of the disclosure.

FIG. 3c is a schematic diagram of manufacturing a blue filter B with a method for manufacturing a color film substrate according to an embodiment of the disclosure. The halftone mask plate 200 is aligned with a position of the blue filter, then an exposure process and a development process are performed to form the blue filter B.

Optionally, the step of forming the black matrix with the same halftone mask plate comprises: respectively aligning the halftone mask plate with all positions for the plurality of color filters of the at least one color and performing an exposure process; and performing a development process to form the black matrix having the plurality of openings.

Figure 3D:
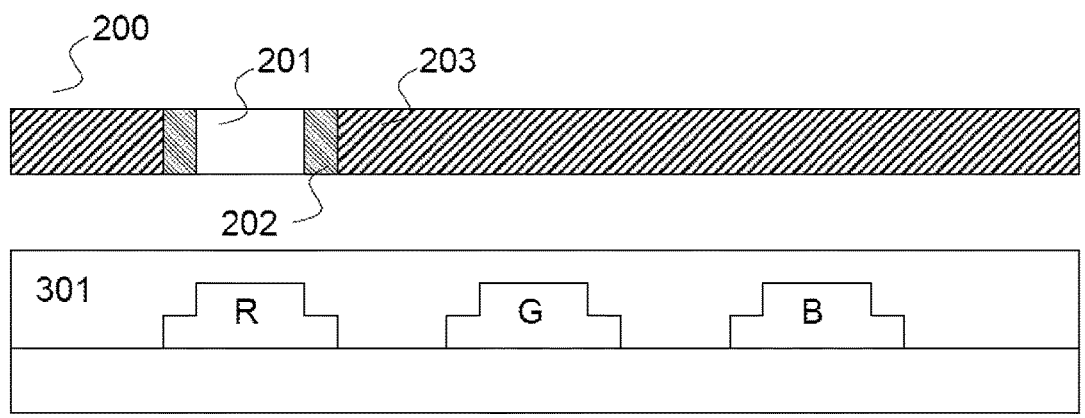
FIGS. 3d-3f are schematic diagrams of manufacturing a black matrix with a method for manufacturing a color film substrate according to an embodiment of the disclosure.
Figure 3E:
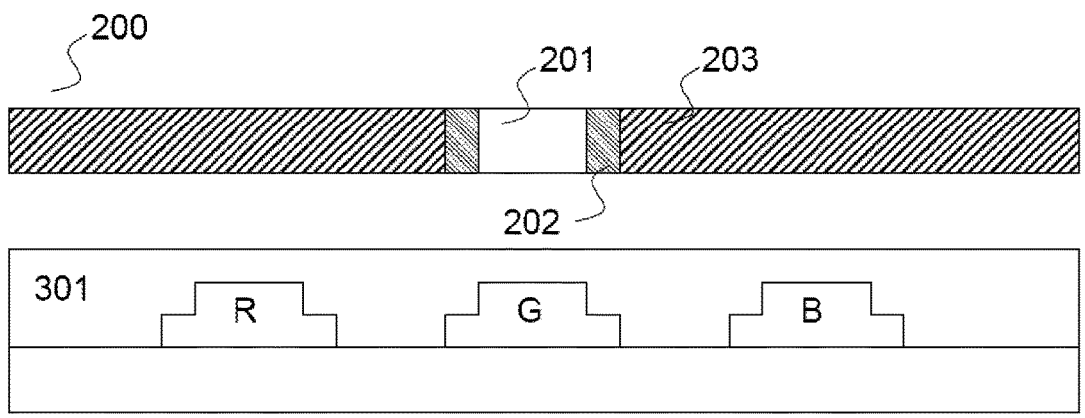
Figure 3F:
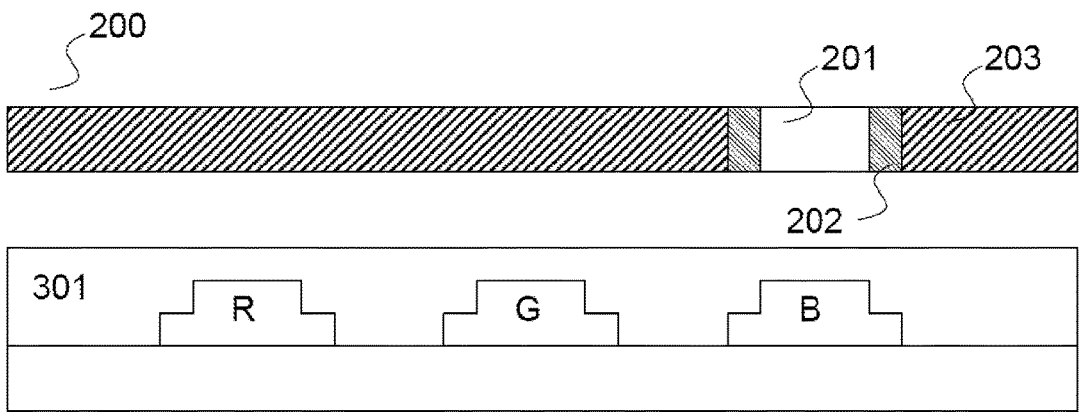

FIGS. 3d-3f are schematic diagrams of manufacturing a black matrix with a method for manufacturing a color film substrate according to an embodiment of the disclosure.

As shown in FIG. 3d, the halftone mask plate 200 is aligned with the position of the red filter R, an exposure process is then performed to the photoresist 301 for the black matrix. As shown in FIG. 3e, the halftone mask plate 200 is shifted to be aligned with the position of the green filter G, an exposure process is then performed to the photoresist 301 for the black matrix. As shown in FIG. 3f, the halftone mask plate 200 is shifted to be aligned with the position of the blue filter B, an exposure process is then performed to the photoresist 301 for the black matrix. After the exposure processes shown in FIGS. 3d-3f are performed, a development process is performed to form the plurality of openings in the black matrix, which are shown in FIG. 1.

In the method for manufacturing a color film substrate provided by the embodiment of the present disclosure, the T-shaped color filter(s) is firstly formed with the halftone mask plate, the T-shaped opening(s) in the black matrix is then formed with the same halftone mask plate. As shown in FIG. 1, in this way, the color filter and the black matrix have an overlapping region, a desired aperture ratio of the color film substrate can be obtained, and light leakage can also be prevented. Moreover, the black matrix formed with the abovementioned process is thick enough to block light.

Though in the embodiment of the disclosure, the color filter(s) is firstly formed with the halftone mask plate, and the black matrix is then formed with the same halftone mask plate, those skilled in the art can understand that the color film substrate can also be manufactured in reverse order.

Optionally, the color filter (R, G, B) is formed with a negative photoresist, and the black matrix 102 is formed with a positive photoresist.

The black matrix is formed with a positive photoresist, therefore portions of the black matrix requiring no exposure are always shielded by the halftone mask plate during the manufacturing process.

Optionally, the plurality of color filters of at least one color comprises a red filter, a green filter and a blue filter.

A color film substrate can thus be realized with the red filter, green filter and blue filter.

Optionally, the plurality of color filters of at least one color comprises a red filter, a green filter, a blue filter and a white filter.

With the red filter, green filter, blue filter and white filter, a color film substrate can realize a relatively high display brightness.

According to yet another aspect of the disclosure, an embodiment of the disclosure further provides a display device. The display device comprises the color film substrate of the abovementioned embodiments.

According to the display device provided by the embodiment of the present disclosure, by applying the technology of halftone mask plate and positive/negative photoresist, the patterns for the plurality of color filters of the at least one color and the pattern of the black matrix can be formed with one filter mask plate. The black matrix mask plate is thus not required in the color film process, thereby greatly reducing the production cost.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A method for manufacturing a color film substrate; the color film substrate comprising a basal substrate, a plurality of color filters of at least one color formed on the basal substrate, and a black matrix formed on the basal substrate; the black matrix having a plurality of openings one-to-one corresponding to the plurality of color filters of at least one color; wherein the method comprises:

forming the plurality of color filters of at least one color on the basal substrate with a halftone mask plate, the sum of a transparent region and a semi-transparent region of the halftone mask plate corresponding to a pattern of a color filter; and after forming the plurality of color filters of at least one color, forming the black matrix with the same halftone mask plate, the sum of the semi-transparent region and an opaque region of the halftone mask plate corresponding to a pattern of the black matrix.

2. The method according to claim 1, wherein forming the plurality of color filters of at least one color on the basal substrate with a halftone mask plate comprises:

for each color of the at least one color, aligning the halftone mask plate with a position for a color filter of the color; and performing an exposure process and a development process to form the color filter.

3. The method according to claim 1, wherein forming the black matrix with the same halftone mask plate comprises:

respectively aligning the halftone mask plate with all positions for the plurality of color filters of the at least one color and performing an exposure process; and performing a development process to form the black matrix having the plurality of openings.

4. The method according to claim 1, wherein the color filter is formed with a negative photoresist, and the black matrix is formed with a positive photoresist.

5. The method according to claim 1, wherein the plurality of color filters of at least one color comprises a red filter, a green filter and a blue filter.

6. The method according to claim 1, wherein the plurality of color filters of at least one color comprises a red filter, a green filter, a blue filter and a white filter.

* * * * *